United States Patent
Kanbara et al.

(10) Patent No.: US 7,053,018 B2
(45) Date of Patent: *May 30, 2006

(54) SPHERICAL ALUMINA PARTICLES AND PRODUCTION PROCESS THEREOF

(75) Inventors: Eiji Kanbara, Yokohama (JP); Susumu Shibusawa, Yokohama (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/363,669

(22) PCT Filed: May 28, 2002

(86) PCT No.: PCT/JP02/05156

§ 371 (c)(1),
(2), (4) Date: Sep. 12, 2003

(87) PCT Pub. No.: WO02/098796

PCT Pub. Date: Dec. 12, 2002

(65) Prior Publication Data

US 2005/0035230 A1    Feb. 17, 2005

Related U.S. Application Data

(60) Provisional application No. 60/296,753, filed on Jun. 11, 2001.

(30) Foreign Application Priority Data

May 30, 2001  (JP)  ............................. 2001-163188

(51) Int. Cl.
*C04B 35/10* (2006.01)
*C10F 7/02* (2006.01)

(52) U.S. Cl. ...................... 501/127; 423/625; 501/153
(58) Field of Classification Search ................ 501/127, 501/153; 423/625; 524/437
See application file for complete search history.

(56) References Cited

U.S. PATENT DOCUMENTS

| | | | |
|---|---|---|---|
| 4,193,768 A | 3/1980 | Hasegawa et al. | |
| 4,315,839 A | 2/1982 | Bouge et al. | |
| 4,382,879 A | 5/1983 | Funabashi et al. | |
| 5,340,781 A | * 8/1994 | Oda et al. | ................... 501/127 |

FOREIGN PATENT DOCUMENTS

| | | | |
|---|---|---|---|
| DE | 0 499 585 | * | 8/1992 |
| EP | 0 499 585 A | | 8/1992 |
| EP | 0 680 929 A | | 11/1995 |
| EP | 0 933 397 A | | 8/1999 |
| JP | 05-294613 A | | 11/1993 |

OTHER PUBLICATIONS

International Search Report for PCT/JP02/05156 dated Aug. 21, 2002.

* cited by examiner

*Primary Examiner*—Anthony J. Green
(74) *Attorney, Agent, or Firm*—Sughrue Mion, PLLC

(57) ABSTRACT

A process for producing roundish alumina particles includes the steps of granulating a composition containing at least one pulverized product of electrofused alumina and sintered alumina having a mean particle size of 5 to 35 μm and at least one species selected from the group consisting of a halogen compound, a boron compound and an alumina hydrate to obtain a granulated product, heating the granulated product at 1,000 to 1,600° C., and crushing the heated product.

11 Claims, No Drawings

SPHERICAL ALUMINA PARTICLES AND PRODUCTION PROCESS THEREOF

CROSS REFERENCE TO RELATED APPLICATIONS

This application is an application filed under 35 U.S.C. § 111(a) claiming the benefit pursuant to 35 U.S.C. § 119(e)(1) of the filing date of Provisional Application No. 60/296,753 filed Jun. 11, 2001 pursuant to 35 U.S.C. §111(b).

TECHNICAL FIELD

The present invention relates to roundish alumina particles and to an industrial, economical process for producing alumina particles which are particularly useful for materials such as sealing material for electronic parts; fillers; finish lapping material; and aggregates incorporated into refractory, glass, ceramic, or composite material thereof and which cause little wear and exhibit excellent flow characteristics. The invention also relates to roundish alumina particles produced through the process and to a high-thermal-conductive rubber/plastic composition containing the alumina particles.

BACKGROUND ART

In recent years, higher integration and higher density of electronic parts have elevated electric power consumption per chip. Thus, effective removal of the generated heat in order to suppress temperature elevation of electronic elements is a critical issue in the development of electronic elements. In view of the foregoing, alumina, particularly corundum ($\alpha$-alumina), exhibiting excellent thermal conductivity, has become a candidate filler for a heat-dissipation spacer; a substrate material on which insulating sealing materials for semiconductors and parts of semiconductor devices are mounted; etc., and has been used in a variety of fields.

Among such corundum particles, JP-A HEI 5-294613 discloses spherical corundum particles having no fractures, the particles being produced by adding aluminum hydroxide and optional, known agents serving as crystallization promoters in combination to a pulverized product of alumina, such as electrofused alumina or sintered alumina, and firing the mixture.

There has been also known a thermal spraying method in which alumina produced through the Bayer method is atomized into high-temperature plasma or oxygen-hydrogen flame so as to melt and quench, to thereby produce roundish particles. The unit heat energy requirement of the thermal spraying method is large, thus not economical. In addition, the thus-produced alumina, though predominantly containing $\alpha$-alumina, includes by-products such as $\delta$-alumina and has low thermal conductivity. Therefore, such an alumina product is not preferred.

Pulverized products of electrofused alumina or sintered alumina have been known as corundum particles. However, these corundum particles are of indefinite shape having sharp fractures and produce significant wear in a kneader, a mold, etc. during incorporation thereof into rubber/plastic. Thus, these corundum particles are not preferred.

According to the method disclosed in the aforementioned publication, round-shaped corundum particles having no fractures and a mean particle size of 5 to 35 μm can be produced. However, the method poses some problems in relation to production of large amounts of such corundum particles at low costs on an industrial scale.

The method disclosed in the above publication includes adding one or more species selected from among a halogen compound, a boron compound and an alumina hydrate to a pulverized product of electrofused alumina and/or sintered alumina having a predetermined particle size and heating the resultant mixture at 1,000 to 1,550° C. When this method is employed, the fired product is strongly solidified to form aggregates in a container for firing.

The above publication also discloses further addition of an alumina hydrate to reduce the hardness of the aggregates. However, the effect is unsatisfactory. Particularly when a large container for firing is employed in order to produce large amounts of corundum particles on an industrial scale, the resultant fired aggregates become commensurate to the size of the container for firing. When the aggregates are crushed and pulverized, multi-step crushing must be carried out, resulting in considerably high costs.

Moreover, since the fired product is strongly adhered to the inner surface of the container for firing, removal of the fired product is difficult, requiring additional treatment such as application of mechanical stress. In this case, considerably large stress is applied to the container for firing, which may cause breakage of the container itself. Thus, this method is not satisfactory in terms of economy.

The present inventors have carried out extensive studies in order to solve the problems in relation to the aforementioned conventional techniques, and have found that, in the production process for spherical corundum particles, a mixture composition is granulated prior to heat treatment and the resultant granules are fired to thereby solve the problems. The present invention has been accomplished on the basis of this finding.

DISCLOSURE OF THE INVENTION

The present invention provides a process for producing roundish alumina particles comprising the steps of granulating a composition containing at least one pulverized product of electrofused alumina and sintered alumina having a mean particle size of 5 to 35 μm and at least one species selected from the group consisting of a halogen compound, a boron compound and an alumina hydrate to obtain a granulated product, heating the granulated-product at 1,000 to 1,600° C., and crushing the heated product.

The process can further comprise a step of washing the heated product with acid before or after the crushing step.

The above process can further comprise a step of washing the acid-washed product with pure water and drying the water-washed product.

In the above process, the drying step is performed by use of a reduced-pressure drying means.

In any one of the above processes, the electrofused alumina and sintered alumina have a mean particle size of 10 μm to 25 μm.

In any one of above processes, the halogen compound is at least one species selected from the group consisting of $AlF_3$, $NaF$, $CaF_2$, $MgF_2$ and $Na_3AlF_6$.

In any one of above processes, the boron compound is at least one species selected from the group consisting of $B_2O_3$, $H_3BO_3$, $mNa_2O \cdot nB_2O_3$, wherein each of m and n is an integer, and a borofluoride compound.

In any one of above processes, the alumina hydrate is at least one species selected from the group consisting of aluminum hydroxide, alumina gel, amorphous aluminum hydroxide and a partial hydrate of aluminum compound.

In any one of above processes, each of the electrofused alumina, sintered alumina and alumina hydrate has an α-ray level of 0.01 c/cm$^2$·hr or less.

In any one of above processes, the granulated product has a particle size of 1 to 30 mmφ.

Any one of the above processes further comprises a step of adding at least one of water and an aqueous solution of an organic substance in an amount of 5 to 50 mass % based on the alumina hydrate during the granulating step.

The present invention also provides roundish alumina particles produced through any one of the above processes.

The roundish alumina particles thus produced have a mean particle size of 5 to 35 μm.

The above roundish alumina particles have an α-ray level of 0.01 c/cm$^2$·hr or less.

The present invention also provides a high-thermal-conductivity rubber composition that contains the roundish alumina particles.

The present invention also provides a high-thermal-conductivity plastic composition that contains the roundish alumina particles.

BEST MODE FOR CARRYING OUT THE INVENTION

The present invention will next be described in detail.

The present invention provides a process for producing roundish alumina particles comprising the steps of granulating a composition containing electrofused alumina and/or sintered alumina having a mean particle size of 5 to 35 μm and at least one species selected from the group consisting of a halogen compound, a boron compound and an alumina hydrate to obtain a granulated product, heating the granulated product at 1,000 to 1,600° C., and subsequently crushing the heated product.

The coarse alumina particles that are employed as a starting material in the present invention may be a pulverized product of electrofused alumina or that of sintered alumina. In either case, the pulverized product is produced through any known method. The electrofused alumina or sintered alumina has a particle size distribution in which the mean particle size is 5 μm to 35 μm, preferably 10 μm to 25 μm, and the maximum particle size is not greater than 150 μm, more preferably 75 μm or less.

When particles having a mean particle size less than 5 μm are employed, roundish alumina particles can be produced through a known method, and therefore, there is no need to use the process of the present invention.

In order to enhance roundness of coarse alumina particles serving as staring material, an alumina hydrate serving as a roundness enhancer may be added in advance to electrofused alumina and/or sintered alumina in accordance with needs, followed by heating.

Examples of the alumina hydrate include aluminum hydroxides, such as gibbsite, bayerite, boehmite and diaspore; amorphous aluminum hydroxides, such as alumina gel and pseudo-boehmite; and aluminum compound partial hydrates, such as aluminum oxide (alumina) whose surface is partially hydrated. Of these, aluminum hydroxide, alumina gel, and alumina microparticles exhibiting high thermal reactivity are particularly preferred. From the viewpoint of economy, aluminum hydroxide (gibbsite) produced through the Bayer method is preferred, and that having a mean particle size of 10 μm or less is most preferred.

The present inventors have observed a quite surprising phenomenon that the aforementioned roundness enhancer acts on coarse alumina particles synergistically with the below-mentioned other agents added in accordance with needs, and selectively acts on (or is absorbed by) irregular, sharp fractures to thereby round coarse alumina particles.

No particular limitation is imposed on the amount of above roundness enhancer, since the amount varies in accordance with the particle size distribution of a pulverized product of electrofused alumina or sintered alumina or a similar factor. For example, when aluminum hydroxide is added, the amount preferably falls within a range of 5 to 300 mass % based on electrofused alumina and/or sintered alumina, as reduced to alumina. More preferably, the amount falls within a range of 50 to 150 mass %. When the aforementioned amount is less than 5 mass %, cohering force of aggregates increases, whereas when the amount is in excess of 300 mass %, excess aluminum hydroxide is released and possibly migrates as alumina microparticles into products.

With regard to other agents that are added in accordance with needs in the granulation step performed prior to heat treatment, known compounds serving as crystal growth promoters for alumina are used singly or, in combination. Preferred crystal growth promoters are halogen compounds preferably led by at least one fluorine compound selected from the group consisting of $AlF_3$, $NaF$, $CaF_2$, $Na_3AlF_6$ and $MgF_2$, and/or at least one boron compound selected from the group consisting of $B_2O_3$, $H_3BO_3$, $mNa_2O.nB_2O_3$, wherein each of m and n is an integer, and a borofluoride compound.

Of these, a combination of the fluorine compound and the boron compound, and the borofluoride compound are particularly preferred. Although the amount of agents to be added cannot be limited and varies in accordance with the heating temperature, the residence time in a furnace and the type of heating furnace, the effective concentration of added agents is 0.1 to 4 mass %, preferably 1 to 3 mass % based on the total alumina components.

The composition containing the pulverized product of electrofused alumina and/or sintered alumina and at least one species selected from the group consisting of a halogen compound, a boron compound and an alumina hydrate is subjected to mixing, granulating and finally heating.

In the aforementioned production method, roundish alumina particles having a low α-ray level can be produced from materials, such as electrofused alumina, sintered alumina, and aluminum hydroxide, all containing trace amounts of radioactive elements, such as uranium and thoria. In other words, electrofused alumina, sintered alumina and aluminum hydroxide that are employed in the present invention preferably have an α-ray level of 0.01 c/cm$^2$·hr or less.

Such roundish alumina particles having a low α-ray level (0.01 c/cm$^2$·hr) are particularly useful for preventing operation failure of memory devices (i.e., software error) caused by α-rays when the particles are used as a filler of a resin sealing material for high-integration ICs, LSIs and VLSIs.

The roundish alumina produced according to the present invention assumes the form of coarse corundum particles that provide no problematic wear of a kneader during incorporation thereof into rubber/plastic or a mold during molding, although some fractures remain.

No particular limitation is imposed on the mixing method, and any customary powder mixing method can be employed so long as the method enables homogeneous mixing of the components.

Examples of mixing apparatus employed in the above method include a rocking blender, a Nauter mixer, a ribbon mixer, a V-shape blender and a Henschel mixer. Other than these apparatus, crushers such as a ball mill and a vibrating mill may be used.

Upon mixing, a solvent (medium) such as water or alcohol can also be added. Subsequently, the thus-prepared mixture composition is subjected to granulation. The shape of the resultant granules is not necessarily perfectly spherical, and the shape is not particularly limited so long as it provides spaces of at least a certain volume between the granules charged in a container for firing.

Specifically, the packing density of the granulated product in the container for firing preferably falls within a range of 0.25 to 0.50 times the theoretical density of the granulated product, more preferably 0.25 to 0.30 times. When the packing density is in excess of 0.50 times, the fired product forms strongly solidified aggregates that are monolithically adhered to the container for firing, which is problematic. When the packing density is less than 0.25 times, the fired product can readily be disintegrated into unit granules. However, firing efficiency is unsatisfactory due to a considerably low packing density, resulting in economical disadvantages.

The size of the granules is preferably small so as to facilitate crushing the fired product. However, too small a size is not preferred, since the packing density deviates from the aforementioned range. Thus, the size is appropriately determined in accordance with the dimensions of a container for firing. The size is typically 1 to 30 mmφ (projection circle equivalent diameter), preferably 5 to 20 mmφ. As used herein, the projection circle equivalent diameter refers to the Heywood diameter described in *Funtai Kogaku Binran* (edited by The Society of Powder Technology, Japan), etc.

No particular limitation is imposed on the granulation method so long as the method enables production the aforementioned granules. Examples of granulation apparatus include a stir granulator, a fluidization bed granulator and a compression granulator. Granulators such as a pan-type granulator are preferred from the viewpoint of economy.

During granulation, a liquid medium such as water or alcohol or a solution of an organic binder such as polyvinyl alcohol (PVA) or polyacrylic acid resin may, be added. Addition of such an organic binder is preferred, since the yielded granulated product has an appropriate strength, thereby preventing a phenomenon such as disintegration of the granulated product during handling thereof. If the granulated product is not required to have a particularly high strength, addition of water is most preferred from the viewpoint of economy.

The amount of the aforementioned liquid medium or the organic binder which is added during granulation is appropriately selected in accordance with the particle size of the employed coarse alumina particles and, when aluminum hydroxide is added, in accordance with the particle size thereof, the amount of added aluminum hydroxide, etc. Preferably, the amount is 5 to 50 mass % based on the amount of added aluminum hydroxide, most preferably 25 to 40 mass %. Amounts in excess of 50 mass % are not preferred, since the entirety of the composition is fluidized, failing to complete granulation. Also, amounts of less than 5 mass % are not preferred, since the strength of the granulated product considerably decreases, causing disintegration and failing to maintain the form of granules.

Subsequently, the granulated product undergoes heat treatment. In the heat treatment step, the aforementioned organic binder is burnt off.

The type of the heating furnace employed in the heat treatment is not limited, and known means such as a single kiln, a tunnel kiln and a rotary kiln may be employed. A heating temperature of 1,000° C. or higher attains the object of the present invention. The heat treatment temperature particularly preferably falls within a range of 1,350° C. to 1,600° C. inclusive. When the temperature is elevated to temperatures higher than 1,600° C., cohering force among the particles increases, thereby inhibiting crushing to primary particles.

The required residence time in the heating furnace, which varies in accordance with the heating temperature, is 30 minutes or longer, preferably approximately one hour to three hours. The coarse alumina particles produced through the aforementioned method form secondary aggregated particles. Thus, the particles are crushed by means of a known pulverization means, such as a ball mill, a vibrating mill or a jet mill, to thereby yield roundish alumina particles having a target particle size distribution.

When the alumina particles are incorporated in an IC sealing material or a similar material that desirably contains no ionic impurity, washing with water, acid, alkali, etc. may be carried out before and/or after crushing.

No particular limitation is imposed on the washing method. However, since the spherical alumina particles yielded through the above-described method typically contain ionic impurities predominantly containing elements, such as F, B and Na, a preferred washing method includes suspending the spherical alumina particles in an acidic solution, separating the solid from the suspension after passage of a predetermined period of time, washing the solid with pure water or similar liquid, and drying. When a monobasic acid such as HCl or $HNO_3$ is used, filtration speed may be slow. Thus, among acids, polybasic acids are preferably employed, with acids such as citric acid, phosphoric acid and sulfuric acid being particularly preferred from the viewpoint of economy.

No particular limitation is imposed on the concentration of the acid, and the concentration that allows the pH of slurry to fall within an acidic range works. Typically, the concentration is 0.01 N to 5 N, preferably 0.1 to 1 N. A concentration of less than 0.01 N is not preferred, since the pH of the slurry may fall within an alkaline range. Also, a concentration of more than 1 N is not preferred, since the concentration is not economical and the added acid remains in alumina.

No particular limitation is imposed on the ratio of the powder amount to the liquid amount (i.e., slurry concentration), and the ratio is appropriately determined in accordance with stirring performance, shape, etc. of a reactor. Typically, the ratio is 50 to 1,000 g/liter, preferably 200 to 800 g/liter and more preferably 300 to 600 g/liter. When the ratio (solid content) is higher than 1,000 g/liter, sedimentation or a similar phenomenon occurs significantly. In contrast, a ratio (solid content) of less than 50 g/liter does not attain high efficiency.

No particular limitation is imposed on the acid treatment temperature, and the treatment is typically carried out at 60° C. or higher, preferably 80° C. or higher. A temperature lower than 60° C. is not preferred, since the amounts of impurities removed through extraction decrease, and the filtration speed decreases.

No particular limitation is imposed on the filtration method. Examples of filtration apparatus which are employable include vacuum filters, such as a drum filter, a horizontal filter and a horizontal belt filter, pressure filters, such as a pressure drum filter, a leaf filter and a filter press, expression filters, such as a belt press and a screw press, centrifugal settling filters, such as a screw decanter, and centrifugal filters.

The amount of washing water is appropriately determined in accordance with the demanded impurity level. Typically, the amount is 1 liter or more per kg of alumina, preferably 1 to 3 liters. Washing water in amounts of less than 1 liter is not preferred, since impurities still remain. Amounts in excess of 3 liters are not economical.

No particular limitation is imposed on the method of drying a cake of washed particles, and any customary driers can be employed so long as the residual water level is reduced to 0.1 mass % or less. Driers that can be employed for drying powder may be used, and examples thereof include a box-type drier, a tunnel drier, a band drier, a fluidization drier and a paddle drier.

Preferably, drying is performed at as low a temperature as possible. This is because, when the powder is dried at high temperature, the diffusion rate of alkali ions contained in the power increases, thereby migrating to the powder surface. The most preferred drier is a vibration fluidization drier that allows heating under reduced pressure.

The roundish alumina particles produced according to the process of the present invention are preferably incorporated into rubber or plastic to thereby provide a high-thermal-conductivity rubber composition and a high-thermal-conductivity plastic composition. Particularly, the content is preferably 80 mass % or more.

In the present invention, no particular limitation is imposed on the type of plastic (resin) which constitutes the aforementioned high-thermal-conductivity plastic composition, and any known resins can be employed. Examples thereof include unsaturated polyester resins, acrylic resins, vinyl ester resins, epoxy resins, xylene-formaldehyde resins, guanamine resins, diaryl phthalate resins, phenolic resins, furan resins, polyimide resins, melamine resins and urea resins. Examples of preferred resins include unsaturated polyester resins, acrylic resins, vinyl ester resins and epoxy resins.

In the present invention, no particular limitation is imposed on the type of rubber material (e.g., rubber component) that constitutes the aforementioned high-thermal-conductivity rubber composition, and any known rubber materials can be employed.

The present invention will next be described in detail using Examples and Comparative Examples, which should not be construed as limiting the invention thereto.

In the following Examples and Comparative Examples, packing density of each, granulated product was measured through the method, wherein the granulated product was gently placed in a cylinder, and apparent density thereof was calculated from the volume and the weight thereof and wherein the ratio of the thus-obtained apparent density to the theoretical density calculated from the compositional proportions of the product was employed.

EXAMPLES 1 TO 5 AND COMPARATIVE EXAMPLE 1

Added to 100 parts by mass of a commercially available sintered alumina crushed product having a mean particle size of 25 μm and a maximum particle size of 75 μm were 2.5 parts by mass of aluminum fluoride anhydrate (product of Morita Chemical Industry Co., Ltd.), 2.5 parts by mass of boric acid (product of U.S. Borax Inc.) and 50 parts by mass of aluminum hydroxide (product of Showa Denko K. K.) having a mean particle size of 1 μm. The entirety was mixed by means of a V-shape blender. The mixture was granulated by means of a pan-type granulator under the conditions shown in Table 1 below. The packing density of the granulated product was measured. The results are also shown in Table 1.

Next, the granulated product was placed in heat-resistant firing vessels made of corundum-mullite material, and heated at a maximum temperature of 1,380° C. for a residence time of three hours in a tunnel kiln. With respect to each product, the ratio of the number of heat-resistant firing vessels which had broken upon removal of each content to ten heat-resistant firing vessels (the ratio being called percent saggar breakage) was calculated. The results are also shown in Table 1. The fired products were compared with one another in respect of relative hardness (represented by five relative ratings shown in Table 1). Each roughly crushed product was crushed by means of a ball mill for a period of time shown in Table 1, and the particle size distribution of the thus-crushed product was measured by means of a microtrack particle size analyzer.

COMPARATIVE EXAMPLE 2

The procedure of Example 1 was repeated, except that addition of aluminum hydroxide and granulation were omitted. The results are also shown in Table 1.

COMPARATIVE EXAMPLE 3

The procedure of Comparative Example 1 was repeated, except that aluminum hydroxide was added in an amount of 300 parts by mass. The results are also shown in Table 1.

TABLE 1

| | Examples | | | | | Comparative Examples | | |
| --- | --- | --- | --- | --- | --- | --- | --- | --- |
| | 1 | 2 | 3 | 4 | 5 | 1 | 2 | 3 |
| Sintered alumina (parts) | | | | 100 | | | | |
| Mean particle size (μm) | | | | 25 | | | | |
| Maximum particle size (μm) | | | | 75 | | | | |
| Aluminum hydroxide (parts) | | | 50 | | | | 0 | 300 |
| Boric acid (parts) | | | | 2.5 | | | | |
| Aluminum fluoride (parts) | | | | 2.5 | | | | |
| Granulation Solvent added (parts) | Water 20 | Water 20 | Water 20 | PVA 20 | Water 5 | Water 30 | None None | None None |
| Particle size of granules (mm) | 1–5 | 5–20 | 10–50 | 1–5 | 1–50 | Granulation impossible | None | None |
| Packing density (–) | 0.29 | 0.31 | 0.28 | 0.32 | 0.26 | | 0.24 | 0.23 |
| Percent saggar breakage (%) | 10 | 10 | 0 | 0 | 10 | | 100 | 90 |
| Hardness of fired product (relative rating*[1]) | (1) | (2) | (2) | (1) | (2) | | (4) | (5) |

TABLE 1-continued

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Crushing time (min) | 15 | 15 | 20 | 15 | 25 |  | 60 | 40 |
| Mean particle size (μm) | 28 | 32 | 30 | 32 | 31 |  | 33 | 32 |

*[1]Relative ratings
(1) Readily disintegrable by hands;
(2) Disintegrable by small power;
(3) Not readily disintegrable;
(4) Solidified powder, difficult to disintegrate;
(5) Solidified powder, disintegrable only by means of a hammer, etc.

EXAMPLES 6 TO 12

The alumina particles that had been produced in Example 5 were washed under the conditions shown in Table 2 below. A horizontal belt filter was employed as a filtration apparatus. Filtration speed was obtained by measuring the filtration time required for washing and filtration of a predetermined amount of slurry by use of a Buchner funnel which was employed for the measurement purpose, and the filtration speed was evaluated by five ratings: (1) very rapid through (5) very slow. A vibration fluidization drier was employed only in Example 10, and a box-type drier was employed except for Example 10. Conductivity was measured at room temperature for slurry that had been prepared by suspending 20 g of each powder in 10 ml of purified water. The amount of an ionic impurity was obtained by measuring an impurity level of an extract that had been prepared through extraction with hot water at 100° C. for two hours.

The general procedure of Example 1 including firing and crushing was repeated, except that 250 g of the above-produced alumina particles were used instead of the alumina particles of Example 1, to thereby yield granules. The particle size of the granules was found to be 1 to 5 mm, and the packing density was found to be 0.31 (relative ratio). The fired product thereof exhibited a hardness that allowed easy disintegration by hands. By crushing for 15 minutes, roundish alumina particles having an α-ray level of 0.004 c/cm$^2$·hr and a mean particle size of 33 μm were obtained.

EXAMPLE 14

The procedure of Example 8 was repeated, except that the low-α-ray alumina that had been prepared in Example 13 was used and that washing was performed under the con-

TABLE 2

|  | Examples | | | | | | |
| --- | --- | --- | --- | --- | --- | --- | --- |
|  | 6 | 7 | 8 | 9 | 10 | 11 | 12 |
| Acid |  | 0.5N H$_2$SO$_4$ | | | | 2N H$_2$SO$_4$ | 0.5N HCl |
| Slurry temperature (° C.) | Ambient | 60 | 80 | 80 | 80 | 80 | 80 |
| Slurry concentration (g/L) | 400 | 400 | 400 | 400 | 400 | 400 | 400 |
| Washing water amount (L)*[1] | 2 | 2 | 2 | 0.5 | 2 | 2 | 2 |
| Filtration speed*[2] | (4) | (3) | (1) | (1) | (1) | (2) | (5) |
| Drying method*[3] | AS | AS | AS | AS | Vacuum | AS | AS |
| Conductivity (μS/cm)*[4] | 4 | 4 | 4 | 10 | 4 | 7 | 6 |
| Ionic impurity level*[5] |  |  |  |  |  |  |  |
| Na$^+$ (ppm) | 6 | 5 | 5 | 7 | 3 | 5 | 5 |
| SO$_4^{2-}$ (ppm) 8 | 8 | 8 | 10 | 6 | 15 | — |  |

*[1]Amount of water required for washing 1 L of slurry
*[2]Measurement of the filtration time required for washing and filtration of a predetermined amount of slurry by use of a Buchner funnel, evaluated by measured five ratings: (1) very rapid through (5) very slow
*[3]Allowed to stand (As) (box-type drier), Vacuum (vibration fluidization drier)
*[4]Powder (20 g) + purified water (100 g)
*[5]Extraction with hot water at 100° C. for 2 hours

EXAMPLE 13

Ingots prepared through electrofusion of commercially available low-α-ray alumina (product of Showa Denko K. K.) having an α-ray level of 0.01 c/cm$^2$·hr or lower were crushed, pulverized and classified under conditions which prevent contamination with radioactive elements to thereby yield coarse electrofused alumina particles having a mean particle size of 30 μm and an α-ray level of 0.005 c/cm$^2$·hr.

ditions of Example 8 shown in Table 2. The product was found to have a conductivity of 4 μS/cm, Na$^+$ level of 5 ppm, and SO$_4^{2-}$ level of 7 ppm.

INDUSTRIAL APPLICABILITY

According to the process of the present invention, roundish, coarse alumina particles can be produced on an industrial scale at low costs. The roundish alumina particles produced through the process of the present invention exhibit excellent fluidity and provide substantially no problematic wear of machines and apparatus.

The invention claimed is:

1. A process for producing roundish alumina particles comprising the steps of granulating a composition containing at least one pulverized product of electrofused alumina and sintered alumina having a mean particle size of 5 to 35 μm and at least one species selected from the group consisting of a halogen compound, a boron compound and an alumina hydrate to obtain a granulated product, heating the granulated product at 1,000 to 1,600° C., and crushing the heated product.

2. The process according to claim 1, further comprising a step of washing the heated product with acid before or after the crushing step.

3. The process according to claim 2, further comprising a step of washing the acid-washed product with pure water and drying the water-washed product.

4. The process according to claim 3, wherein the drying step is performed by use of a reduced-pressure drying means.

5. The process according to any one of claims 1 to 4, wherein the electrofused alumina and sintered alumina have a mean particle size of 10 μm to 25 μm.

6. The process according to claim 1, wherein the halogen compound is at least one species selected from the group consisting of $AlF_3$, NaF, $CaF_2$, $MgF_2$ and $Na_3AlF_6$.

7. The process according to claim 1, wherein the boron compound is at least one species selected from the group consisting of $B_2O_3$, $H_3BO_3$, $mNa_2O.nB_2O_3$, wherein each of m and n is an integer, and a borofluoride compound.

8. The process according to claim 1, wherein the alumina hydrate is at least one species selected from the group consisting of aluminum hydroxide, alumina gel, amorphous aluminum hydroxide and a partial hydrate of aluminum compound.

9. The process according to claim 1, wherein each of the electrofused alumina, sintered alumina and alumina hydrate has an α-ray level of 0.01 c/cm²·hr or less.

10. The process according to claim 1, wherein the granulated product has a particle size of 1 to 30 mmφ.

11. The process according to claim 1, further comprising a step of adding at least one of water and an aqueous solution of an organic substance in an amount of 5 to 50 mass % based on the alumina hydrate during the granulating step.

* * * * *